US010000650B2

(12) United States Patent
Yamazaki

(10) Patent No.: US 10,000,650 B2
(45) Date of Patent: Jun. 19, 2018

(54) INK SET AND RECORDING APPARATUS

(71) Applicant: Seiko Epson Corporation, Tokyo (JP)

(72) Inventor: Soichi Yamazaki, Shiojiri (JP)

(73) Assignee: Seiko Epson Corporation (JP)

( * ) Notice: Subject to any disclaimer, the term of this patent is extended or adjusted under 35 U.S.C. 154(b) by 144 days.

(21) Appl. No.: 15/001,570

(22) Filed: Jan. 20, 2016

(65) Prior Publication Data

US 2016/0208122 A1    Jul. 21, 2016

(30) Foreign Application Priority Data

Jan. 21, 2015    (JP) .................................. 2015-009816

(51) Int. Cl.
| | | |
|---|---|---|
| *B41J 2/21* | (2006.01) | |
| *C09D 11/40* | (2014.01) | |
| *B41J 2/165* | (2006.01) | |
| *C09D 11/324* | (2014.01) | |
| *C09D 11/38* | (2014.01) | |

(52) U.S. Cl.
CPC ............. *C09D 11/40* (2013.01); *B41J 2/1652* (2013.01); *B41J 2/16508* (2013.01); *B41J 2/16532* (2013.01); *B41J 2/16535* (2013.01); *B41J 2/16585* (2013.01); *B41J 2/2107* (2013.01); *C09D 11/324* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 11/0015; B41J 11/002; B41J 2/2056; B41J 2/21; B41J 2/0057; B41J 3/60; B41J 2/1652; B41J 2/16535; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ...................................... 347/95–105
See application file for complete search history.

(56) References Cited

U.S. PATENT DOCUMENTS

| | | | | |
|---|---|---|---|---|
| 6,189,991 B1* | 2/2001 | Wen | ..................... | B41J 11/0065 347/42 |
| 2005/0117008 A1* | 6/2005 | Konishi | ................. | C09D 11/40 347/100 |
| 2011/0216123 A1* | 9/2011 | Tamai | .................. | C09D 11/322 347/100 |
| 2012/0162307 A1* | 6/2012 | Yamazaki | .............. | B41J 2/2107 347/20 |
| 2013/0286118 A1* | 10/2013 | Okada | .................... | B41J 2/2146 347/100 |

FOREIGN PATENT DOCUMENTS

JP    2012-136589 A    7/2012

* cited by examiner

*Primary Examiner* — Manish S Shah
(74) *Attorney, Agent, or Firm* — Harness, Dickey & Pierce, P.L.C.

(57) ABSTRACT

Provided is an ink set including black ink and color ink, in which the black ink contains carbon black having a carboxyl group on a surface thereof, a resin particle having a carboxyl group on a surface thereof, betaine, an alkali ion, and water, the alkali ion contains a potassium ion, a sodium ion, and an organic alkali compound, and a content of the potassium ion is the largest among the alkali ions.

22 Claims, 5 Drawing Sheets

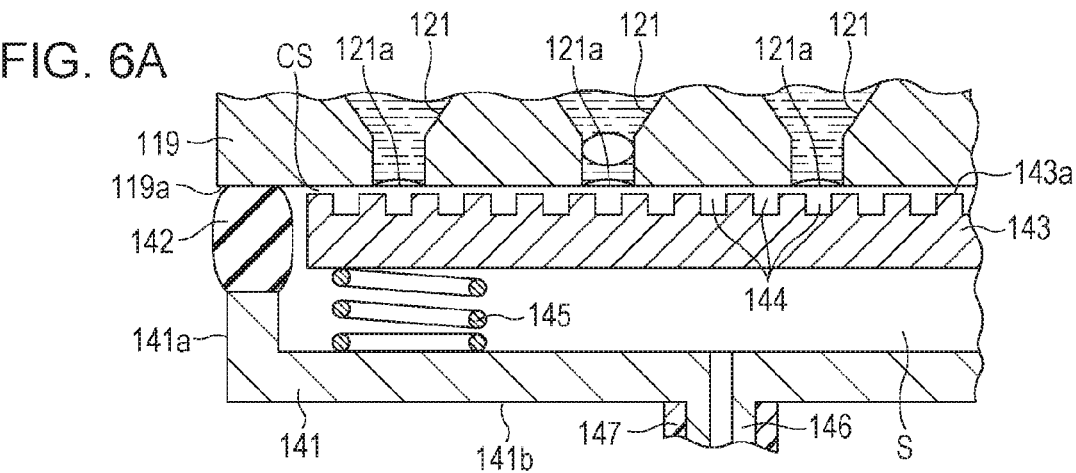
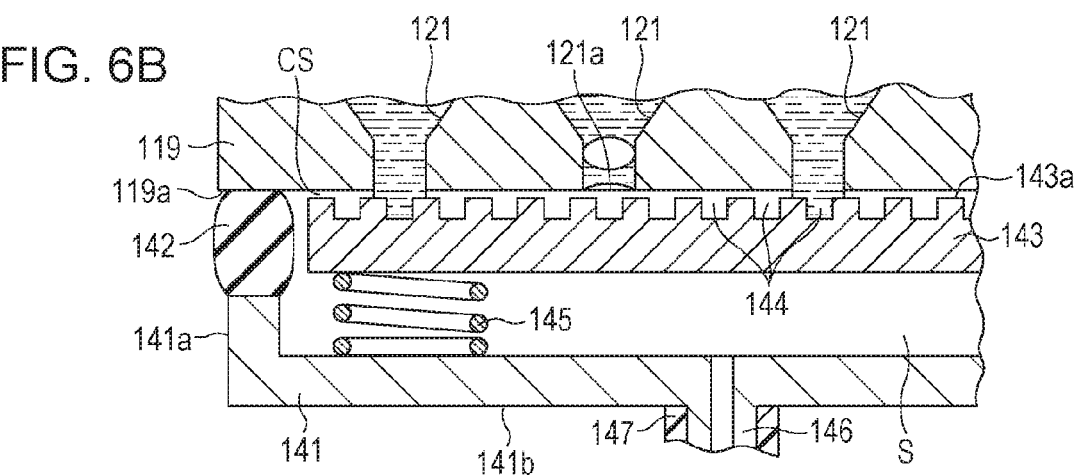
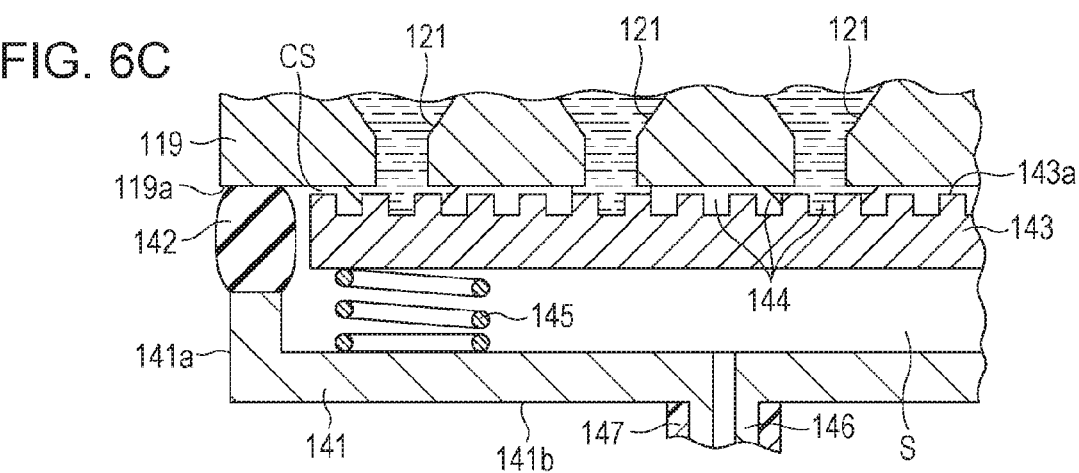

INK SET AND RECORDING APPARATUS

BACKGROUND

1. Technical Field

The present invention relates to an ink set and a recording apparatus.

2. Related Art

Since an ink jet recording method is performed by using a relatively simple device and is capable of recording a high definition image, it has achieved rapid development in various fields. Various studies have been made on ejection properties upon the high speed recording. For example, JP-A-2012-136589 discloses pigment ink which contains acetylene glycol, an unsaturated fatty acid, an amino acid, an alkali metal hydroxide, and an amine in order to provide pigment ink which is capable of forming a high quality image at a high speed by suppressing the occurrence of satellites (small droplets other than main drop droplets of the discharged ink), and an ink jet recording apparatus and ink jet recording method which use the pigment ink.

However, even in a case where ink has high long-term stability, the long-term stability of a pigment or a resin is deteriorated caused by disturbances such as color-mixed ink caused by wiping or the like, and thereby nozzle omission is likely to occur. In addition, disturbances such as foreign matters being mixed from a tube or a head member with which ink comes in contact can be assumed.

In recent years, development of high resolution and enlargement of a head (increase in operating speed) have been progressed. Under these circumstances, there may be a remarkable problem in that aggregation of ink occurs in a nozzle caused by color-mixed ink at the time of wiping, and thus the nozzle omission (the number of omitted nozzles) is more likely to occur. That is, even in a case where the ink has high long-term stability, in the practical use of the recording apparatus, there remains a problem in that the long-term stability is deteriorated due to the occurrence of ink aggregation caused by the disturbances. There is a tendency that the aforementioned problem is particularly remarkable in ink containing a carbon black and a resin, in an ink set.

In addition, the aggregation of ink not only occurs in the nozzle, but also on a wiping member for cleaning the nozzle. In a case where the aggregation of ink occurs on the wiping member, the cleaning of the nozzle may cause clogging of a normal nozzle.

SUMMARY

An advantage of some aspects of the invention is to provide an ink set in which, even when black ink and color ink are mixed with each other in a small amount at the time of wiping, the black ink is not easily aggregated, or the black ink does not easily cause other color inks to be aggregated, and a recording apparatus which is provided with the ink set.

The inventors have conducted intensive studies in order to solve the above problems. As a result, it has been found that the above problems can be solved by using a predetermined black ink, and therefore, the invention is completed.

That is, the invention is configured as follows.

[1] An ink set including black ink; and color ink, in which the black ink contains carbon black having a carboxyl group on a surface thereof, a resin particle having a carboxyl group on a surface thereof, betaine, an alkali ion, and water, the alkali ion contains a potassium ion, a sodium ion, and an organic alkali compound, and a content of the potassium ion is the largest among the alkali ions.

[2] The ink set according to the above-described [1], in which in the black ink, the content of the potassium ion is in a range of 0.0010 mol/L to 0.20 mol/L, and a content of the sodium ion is in a range of 0.00010 mol/L to 0.10 mol/L.

[3] The ink set according to the above-described [1] or [2], in which the color ink contains a metal alkali ion, and a content of the metal alkali ion is in a range of 0 mol/L to 0.10 mol/L.

[4] The ink set according to any one of the above-described [1] to [3], in which the black ink contains at least one acid selected from the group consisting of an organic acid, a phosphoric acid compound, and a boric acid compound.

[5] The ink set according to any one of the above-described [1] to [4], which is used for a recording apparatus including a printer head which is provided with 4000 or more ink jet discharging nozzles for each color, and a wiping mechanism which wipes the ink jet discharging nozzles by using a wiping member.

[6] The ink set according to the above-described [5], in which the wiping mechanism is a mechanism for pressurizing and wiping the ink jet discharging nozzle by using the wiping member.

[7] The ink set according to any one of the above-described [1] to [6], in which the organic alkali compound contains at least one selected from the group consisting of triisopropanolamine and triethanolamine.

[8] The ink set according to any one of the above-described [1] to [7], in which the betaine contains at least one selected from the group consisting of trimethyl glycine, dimethyl glycine, and glycine.

[9] A recording apparatus including a printer head which is provided with ink jet discharging nozzles; and a wiping mechanism which wipes the ink jet discharging nozzle by using a wiping member, in which the ink set according to any one of the above-described [1] to [8] is installed therein.

[10] The recording apparatus according to the above-described [9], in which the printer head is an oblique head.

BRIEF DESCRIPTION OF THE DRAWINGS

The invention will be described with reference to the accompanying drawings, wherein like numbers reference like elements.

FIG. 2A to FIG. 2C are schematic plan views illustrating a structure of the line head, of which, FIG. 2A is a schematic plan view illustrating a state in which a base plate and a nozzle unit are combined with each other, FIG. 2B is a schematic plan view illustrating a structure of the base plate, and FIG. 2C is a schematic plan view illustrating a structure of the nozzle unit.

FIG. 6A to FIG. 6C are schematic sectional views illustrating actions of the maintenance device with respect to a recording head, of which, FIG. 6A is a schematic sectional view illustrating a state where a contact member comes in contact with the recording head, FIG. 6B is a schematic sectional view illustrating a state where ink is discharged from only a normal nozzle, and FIG. 6C is a schematic sectional view illustrating a state where ink is discharged from the nozzle into which air bubbles are mixed.

DESCRIPTION OF EXEMPLARY EMBODIMENTS

Figure 1:
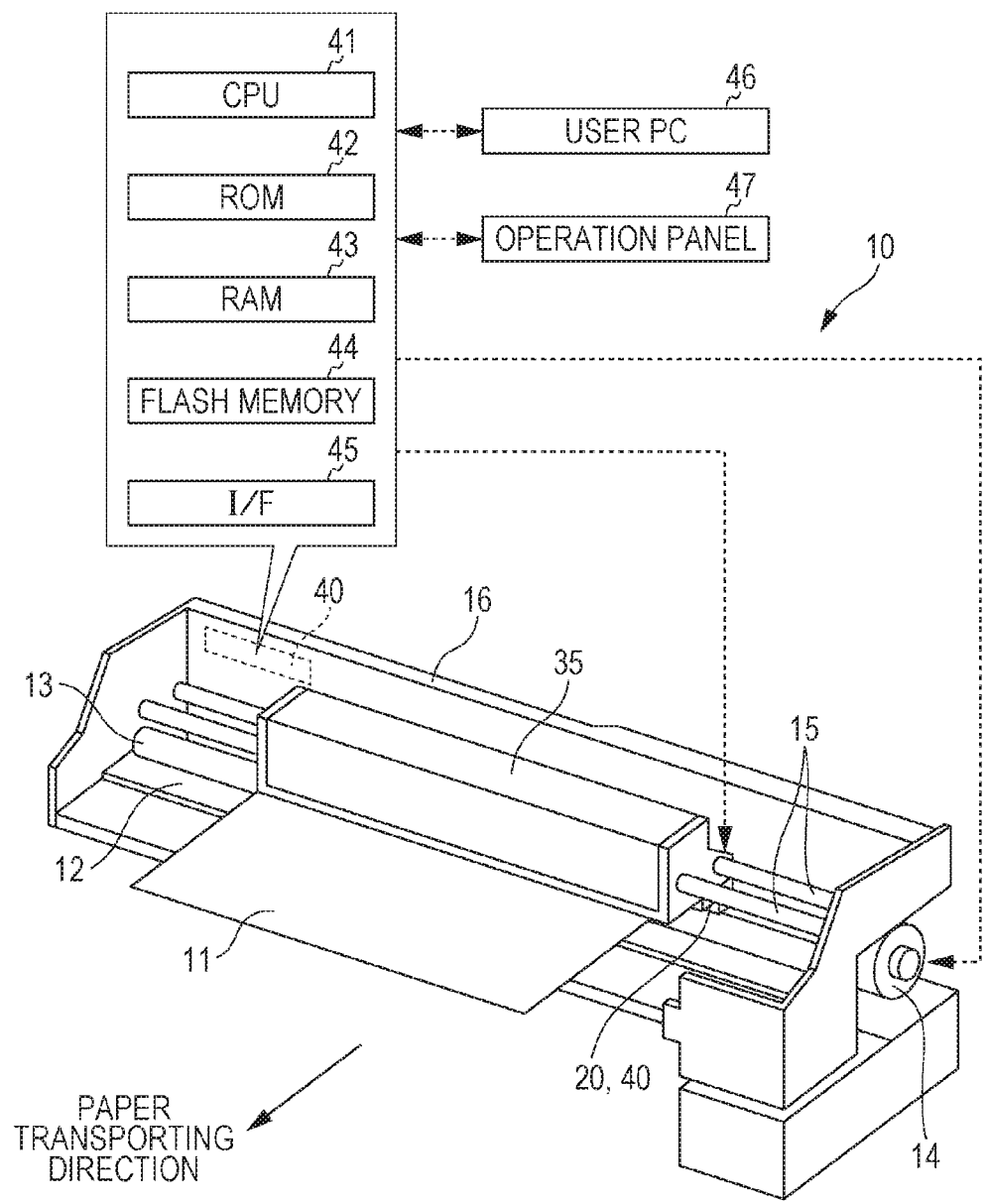
FIG. 1 is a schematic view illustrating a configuration of a recording apparatus which is provided with a line head.

Hereinafter, the embodiment of the invention (hereinafter, referred to as "the embodiment") will be described in detail; however, the invention is not limited thereto and can be variously modified within a scope which does not depart from the gist thereof. Note that, "(Meth)acrylic acid" in the specification represents both acrylic acid and methacrylic acid corresponding to acrylic acid. In addition, in the respective drawings used in the following description, the scale of each component is appropriately changed such that each component (members) can be recognizable in the drawings. The embodiment is not intended to be limited to only a number of components, shapes and size ratios of the components, and relative positional relationship of the components which are not described in the drawings.

Ink Set

The ink set of the embodiment is provided with black ink and color ink, in which the black ink contains carbon black having a carboxyl group on a surface thereof, a resin particle having a carboxyl group on a surface thereof, betaine, an alkali ion, and water, the alkali ion contains a potassium ion, a sodium ion, and an organic alkali compound, and a content of the potassium ion is the largest among the alkali ions.

Black Ink

The black contains carbon black having a carboxyl group on a surface thereof, a resin particle having a carboxyl group on a surface thereof, betaine, an alkali ion, and water, the alkali ion contains a potassium ion, a sodium ion, and an organic alkali compound, and a content of the potassium ion is the largest among the alkali ions. As such, when the carbon black and the resin particle have the same functional groups, there is a tendency that ionic properties of the surface are stabilized with one another, and the aggregation is less likely to occur. In addition, with a larger number of the potassium ions, the aggregation can be further prevented from occurring.

In addition, it is assumed that the foreign matters from a tube or a head member with which ink comes in contact are the sodium ions or the organic alkali compounds. In this regards, when the sodium ions or the organic alkali compounds are contained in the ink in advance, it is possible to prevent the aggregation from occurring even in a case where the foreign matters are mixed from the tube or the head member.

Carbon Black Having Carboxyl Group on Surface Thereof

The carbon black having a carboxyl group on the surface thereof is not particularly limited; however, examples thereof include carbon black which is subjected to an oxidation process or carbon black having a hydrophilic group which is introduced on a surface thereof. Examples of the hydrophilic group include a hydroxyl group, a carboxyl group, a sulfonic acid group, and other hydrophilic groups. Among them, the carbon black having a carboxyl group on the surface thereof is preferably used. When using such carbon black, there is a tendency that the occurrence of the aggregation with respect to the disturbances can be further suppressed. The carbon black may be used alone or in combination of two or more types thereof. In addition, if necessary, carbon black other than the carbon black having a carboxyl group on the surface thereof may be used together.

A content of the carbon black having a carboxyl group on the surface thereof is preferably in a range of 2.0 mass % to 12 mass %, is more preferably in a range of 4.0 mass % to 10 mass %, and is still more preferably in a range of 5.5 mass % to 8.5 mass %, with respect to 100 mass % of black ink.

Resin Particle Having Carboxyl Group on Surface Thereof

The resin particle having a carboxyl group on the surface thereof is not particularly limited; however, examples thereof include a resin or urethane resin which has at least one selected from a group consisting of an acrylic acid and a methacrylic acid as a structural unit. Among these, it is preferable to use a resin which has at least one selected from a group consisting of an acrylic acid and a methacrylic acid as a structural unit, and it is more preferable to use a poly(meth)acrylic acid, a (meth)acrylic acid-acrylonitrile copolymer, a vinyl acetate-(meth)acrylic acid copolymer, a vinyl acetate-(meth)acrylic acid ester copolymer, a (meth)acrylic acid-(meth)acrylic acid ester copolymer, a styrene-(meth)acrylic acid copolymer, a styrene-(meth)acrylic acid-(meth)acrylic acid copolymer, a styrene-α-methyl styrene-(meth)acrylic acid copolymer, a styrene-α-methyl styrene-(meth)acrylic acid-(meth)acrylic acid ester copolymer, a styrene-maleic acid copolymer, a styrene-maleic anhydride copolymer, a vinyl naphthalene(meth)acrylic acid copolymer, a vinyl naphthalene-maleic acid copolymer, a vinyl acetate-maleic acid ester copolymer, and a vinyl acetate-crotonic acid copolymer. When such a resin particle is used, there is a tendency that fixability of a printed matter is further improved. The resin particle may be used alone or in combination of two or more types thereof. In addition, if necessary, resin particles other than the resin particle having a carboxyl group on the surface thereof may be used together.

A content of the resin particle having a carboxyl group on the surface thereof is preferably in a range of 1.0 mass % to 10 mass %, is more preferably 1.5 mass % to 7.5 mass %, is still more preferably 2.5 mass % to 5.0 mass % with respect to 100 mass % of the black ink. When the content of the resin particle having a carboxyl group on the surface thereof is equal to or greater than 1.0 mass %, there is a tendency that fixability of the printed matter is further improved. In addition, when the content of the resin particle having a carboxyl group on the surface thereof is equal to or less than 10 mass %, there is a tendency that the dispersibility of the carbon black becomes further improved.

Betaine

Betaine is not particularly limited as long as it is a compound having a cationic group and anionic group in the same molecule; however, examples thereof include quaternary amine such as trimethyl glycine; tertiary amine such as dimethyl glycine; secondary amine; and an amino acid such as glycine. Among these, at least one selected from a group consisting of trimethyl glycine, dimethyl glycine, and glycine is further preferable. When such betaine is used, there is a tendency that the stability with respect to the disturbances such as the mixing of electrostatic charged foreign matters is further improved. The betaine may be used alone or in combination of two or more types thereof.

The carbon number of betaine is preferably in a range of 3 to 12, is more preferably in a range of 3 to 7, and is still more preferably in a range of 4 to 6. When the carbon number of betaine is within the above range, there is a tendency that the stability with respect to the disturbances such as the mixing of electrostatic charged foreign matters is further improved.

A content of betaine is preferably in a range of 1.0 mass % to 12.5 mass %, is more preferably in a range of 1.5 mass % to 10 mass %, and is still more preferably in a range of 2.5 mass % to 7.5 mass %, with respect to 100 mass % of the black ink. When a content of betaine in an amphoteric ion substance is equal to or greater than 1.0 mass %, a change of electrification is alleviated even with the mixing of the electrostatic charged foreign matters as the disturbances, and thus there is a tendency that the stability of the negative electrification of the carbon black or the resin in the ink is further improved. In addition, when the content of betaine is equal to or less than 12.5 mass %, there is a tendency that the stability of betaine which is a solid body is further improved without inhibiting the stability of the printed matters.

Alkali Ion

Examples of the alkali ion include a potassium ion, a sodium ion, and an organic alkali compound. In addition, if necessary, it may be used by combining with other alkali ions. Note that, alkali does not contain materials which are contained in betaine.

The content of the potassium ion is the largest among the alkali ions. With a relatively large discrepancy constant of potassium ion, the aggregation is less likely to occur with respect to the disturbances. The content of the potassium ion in the black ink is preferably in a range of 0.030 mol/L to 1.0 mol/L, is more preferably in a range of 0.010 mol/L to 0.50 mol/L, and is still more preferably in a range of 0.0010 mol/L to 0.20 mol/L. When the content of the potassium ion is equal to or greater than 0.030 mol/L, there is a tendency that the dispersibility of the dispersing component becomes stable and thus the aggregation is less likely to occur with respect to the disturbances. In addition, when the content of the potassium ion is equal to or less than 1.0 mol/L, there is a tendency that the pH of the black ink becomes stable and thus the aggregation is less likely to occur with respect to the disturbances.

The content of the sodium ion in the black ink is preferably in a range of 0.000050 mol/L to 0.30 mol/L, is more preferably in a range of 0.00010 mol/L to 0.10 mol/L, and is still more preferably in a range of 0.0010 mol/L to 0.050 mol/L. When the content of the sodium ion is equal to or greater than 0.000050 mol/L, there is a tendency that the dispersibility of the dispersing component becomes stable and thus the aggregation is less likely to occur with respect to the disturbances. In addition, when the content of the sodium ion is equal to or less than 0.30 mol/L, there is a tendency that the pH of the black ink becomes stable and thus the aggregation is less likely to occur with respect to the disturbances.

The organic alkali compound is not particularly limited; however, examples thereof include triisopropanolamine, triethanolamine, ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethyl ammonium hydroxide, tetraethyl ammonium hydroxide, tetrapropyl ammonium hydroxide, tetrabutyl ammonium hydroxide, benzyl trimethyl ammonium hydroxide, pyridine, N,N-dimethyl-4-aminopyridine, ammonium carbonate, ammonium hydrogen carbonate, and hydrogen phosphate diammonium. Among these, tertiary amine having steric hindrance is preferably used, and at least one selected from a group consisting of triisopropanolamine and triethanolamine is more preferably used. By using such an organic alkali compound, there is a tendency that the dispersibility of the dispersing component becomes stable and thus the aggregation is less likely to occur with respect to the disturbances.

A content of the organic alkali compound in the black ink is preferably in a range of 0.0050 mol/L to 0.50 mol/L, is more preferably in a range of 0.010 to 0.10 mol/L, and is still more preferably in a range of 0.025 mol/L to 0.075 mol/L. When the content of the organic alkali compound is equal to or greater than 0.0050 mol/L, there is a tendency that the dispersibility of the dispersing component becomes stable and thus the aggregation is less likely to occur with respect to the disturbances. In addition, when the content of the organic alkali compound is equal to or less than 0.50 mol/L, there is a tendency that the pH of the black ink becomes stable and thus the aggregation is less likely to occur with respect to the disturbances.

The total content of alkali ions in the black ink is preferably in a range of 0.025 mol/L to 0.75 mol/L, is more preferably in a range of 0.050 mol/L to 0.50 mol/L, and is still more preferably in a range of 0.10 mol/L to 0.40 mol/L. When the total content of alkali ions is equal to or greater than 0.025 mol/L, there is a tendency that the dispersibility of the dispersing component becomes stable and thus the aggregation is less likely to occur with respect to the disturbances. In addition, when the total content of alkali ions is equal to or less than 0.75 mol/L, there is a tendency that the pH of the black ink becomes stable and thus the aggregation is less likely to occur with respect to the disturbances.

Water

Examples of water include pure water such as ion exchange water, ultrafiltration water, reverse osmosis water, and distilled water, and water obtained by removing ionic impurities as much as possible such as extra pure water. Moreover, it is possible to prevent mold or bacteria from occurring in the case of long-term storage of the ink when using the water which is sterilized by ultraviolet irradiation or the addition of hydrogen peroxide. For this reason, there is a tendency that storage stability is further improved.

A content of water is preferably in a range of 65 mass % to 85 mass %, is more preferably in a range of 68 mass % to 80 mass %, and is still more preferably in a range of 70 mass % to 75 mass %, with respect to 100 mass % of the black ink.

Acid

The black ink may include an acid. When an acid is included in the black ink, alkali ions can be further added into ink, and thus there is a tendency that an aggregation inhibitory action is further improved. An acid is not particularly limited; however, examples thereof include at least one acid selected from a group consisting of an organic acid, a phosphoric acid compound, and a boric acid compound. By containing such an acid, there is a tendency that the aggregation inhibitory action is further improved. In addition, an acid does not contain materials which are contained in betaine.

An organic acid is not particularly limited; however, examples thereof include a formic acid, a citric acid, a succinic acid, an adipic acid, a maleic acid, a gluconic acid, a stearic acid, a tartaric acid, a tartaric acid, a lactic acid, a acetic acid, a fumaric acid, a malic acid, an itaconic acid, and a phytic acid.

The carbon number of organic acids is preferably in a range of 8 to 30, is more preferably in a range of 12 to 22, and is still more preferably in a range of 15 to 20. When the carbon number of organic acids is within the above range, there is a tendency that the dispersion stability of carbon black is further improved.

The total content of acids is preferably in a range of 0.050 mass % to 1.0 mass %, is more preferably in a range of 0.10 mass % to 0.50 mass %, and is still more preferably in a range of 0.20 mass % to 0.40 mass %, with respect to 100 mass % of the black ink. When the total content of acids is equal to or greater than 0.050 mass %, alkali ions can be further added to ink, and thus there is a tendency that the aggregation inhibitory action is further improved. In addition, when the total content of acids is equal to or less than 1.0 mass %, there is a tendency that the pH of the black ink becomes stable and thus the aggregation is less likely to occur with respect to the disturbances.

pH

The pH of the black ink is preferably in a range of 8.0 to 10.5, is more preferably in a range of 8.5 to 10.5, and is still more preferably 9 to 10. When the pH of the black ink is within the above range, there is a tendency that the pH of the black ink becomes stable and thus the aggregation is less likely to occur with respect to the disturbances.

Other Components

Other components of the invention may include a various types of substances such as a surfactant, a penetrating agent, a moisturizer, a preservative, a rust inhibitor, and a pH adjusting agent.

Color Ink

The color ink is not particularly limited; however, examples thereof include coloring materials other than a black pigment, a resin particle, betaine, and water. The color ink may be used alone or in combination of two or more types thereof. As a resin particle, betaine, and water, it is possible to use the same materials as those of the black ink, and the materials may be the same as or different from a main component included in the black ink.

Coloring Material

The coloring material is not particularly limited; however, examples thereof include as follows in accordance with colors.

The pigment used in the white ink is not particularly limited; however, examples thereof include a white inorganic pigment such as C.I. pigments white 6, 18, and 21, titanium oxide, zinc oxide, zinc sulfide, antimony oxide, and zirconium oxide. Other than white inorganic pigment, it is possible to use a white organic pigment such as a white hollow resin particle and a polymeric particle.

The pigment used for the yellow ink is not particularly limited; however, examples thereof include C.I. pigments yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The magenta pigment is not particularly limited; however, examples of the magenta pigment include C.I. pigments red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. pigments violet 19, 23, 32, 33, 36, 38, 43, and 50.

The cyan pigment, is not particularly limited; however, examples thereof include C.I. pigments blue 1, 2, 3, 15, 15:1, 15:2, 15:3, 15:34, 15:4, 16, 18, 22, 25, 60, 65, and 66, and C.I. pigments vat blue 4 and 60.

In addition, the pigment used for the color ink other than magenta, cyan, and yellow is not particularly limited; however, examples thereof include C.I. pigments green 7 and 10, C.I. pigments brown 3, 5, 25, and 26, and C.I. pigments orange 1, 2, 5, 7, 13, 14, 15, 16, 24, 34, 36, 38, 40, 43, and 63.

Alkali Ion

The color ink may include a metal alkali ion. In this case, a content of the metal alkali ion in the color ink is preferably in a range of 0 mol/L to 0.30 mol/L, is more preferably in a range of 0 mol/L to 0.10 mol/L, and is still more preferably 0 mol/L. When the content of the metal alkali ion is equal to or less than 0.30 mol/L, it is possible to prevent the aggregation from occurring even when the color ink and the black ink is mixed at the time of wiping.

It is possible to usefully employ the ink set of the embodiment particularly to a recording apparatus in the following embodiment; however, the use of the ink set is not limited to the following description.

Recording Apparatus

In this embodiment, the recording apparatus is provided with a printer head including an ink jet discharging nozzle, and a wiping mechanism which wipes the ink jet discharging nozzle by using a wiping member, and the above-described ink set is installed therein.

FIG. 1 is a schematic view illustrating a configuration of a recording apparatus (an ink jet type recording apparatus) which is provided with a line head. Hereinafter, the configuration of the recording apparatus will be described with reference to FIG. 1.

As illustrated in FIG. 1, a recording apparatus 10 is provided with a transporting roller 13 which transports a recording sheet 11 onto a platen 12, a step motor 14 which rotatably drives the transporting roller 13, a line head 20 which can be moved by a guide rail 15 in direction perpendicular to a transporting direction (a first direction) of the recording sheet 11 and a discharges ink droplets to the transported recording sheet 11, a vibrating element 30 (refer to FIGS. 3 and 4) which vibrate the line head 20 in the direction perpendicular to the transporting direction of the recording sheet 11, and a controller 40 which controls all operations of the apparatus.

The vibrating element 30, is formed of, for example, a piezoelectric element (an electrostrictive vibrator) such as a PZT, and is attached to the line head 20. Accordingly, when the vibrating element 30 is vibrated, the line head 20 can be vibrated along the guide rail 15 in the direction perpendicular to the transporting direction the recording sheet 11.

The controller 40 is serves as a microprocessor which has a CPU 41 as a main component, and in addition to the CPU 41, is provided with a ROM 42 which stores various processing programs, a RAM 43 which temporarily stores data, a flash memory 44 which is capable of writing and erasing data, an interface (I/F) 45 which performs exchange of information with an external device, and an input and output port (not shown).

The RAM 43 is provided with a print buffer area, and the print buffer area is set such that printing data which is received from a user PC46 via the interface (I/F) 45 can stored. The various operation signals or the like are input to the controller 40 from an operation panel 47 via the input port. In addition, a driving signals, and an output signal are respectively output to the line head 20 and the step motor 14, and the operation panel 47 from the controller 40 via the output port.

In addition, the operation panel 47 is a device which inputs various instructions from a user and displays the state of instructions, although not shown, a display on which characters, drawings, or symbols corresponding to the various instructions are displayed, or buttons for the user to perform various operations.

Printer Head

The printer head includes an ink jet discharging nozzle. The number of nozzles for each color is preferably equal to or greater than 600, is more preferably equal to or greater than 2000, and is still more preferably equal to or greater than 4000. When the number of nozzles for each color is preferably equal to or greater than 600, an amount of ink being wiped becomes larger, and thus there is a tendency that the aggregation is likely to occur. Accordingly, the invention is particularly useful.

Figure 2A:
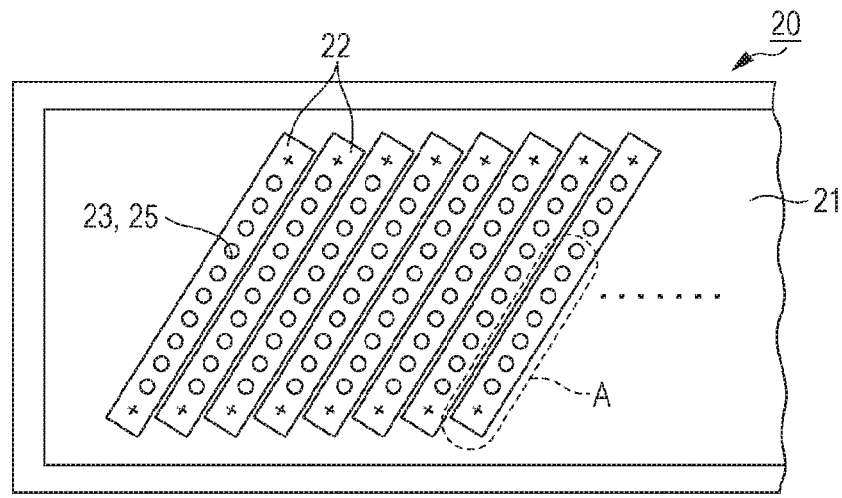
Figure 2B:
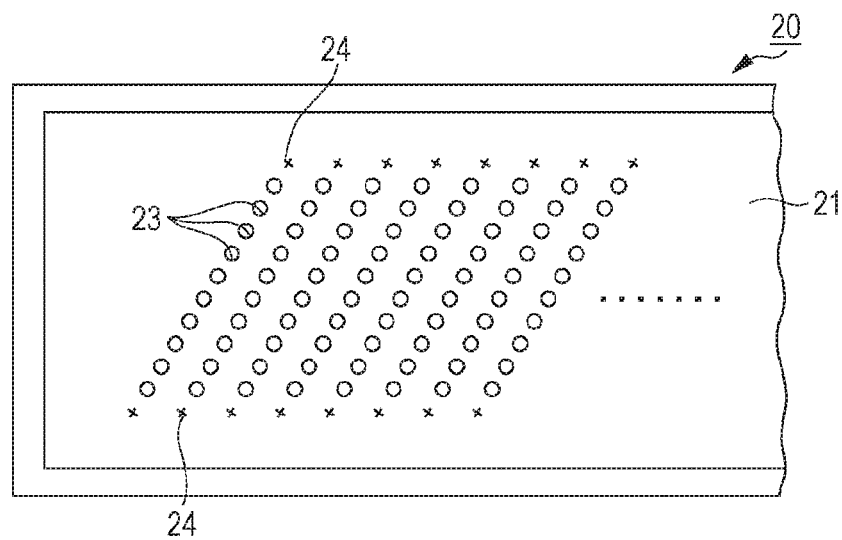
Figure 2C:
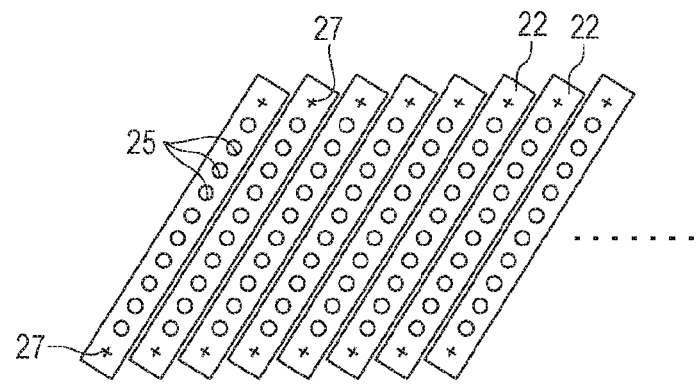

FIG. 2A to FIG. 2C are schematic plan views a illustrating structure of the line head, FIG. 2A is a schematic plan view illustrating a state in which a base plate as a first substrate and a nozzle unit are combined with each other, FIG. 2B is a schematic plan view illustrating a structure of the base plate, and FIG. 2C is a schematic plan view illustrating a structure of the nozzle unit. Hereinafter, the structure of the line head will be described with reference to FIG. 2A to FIG. 2C. Note that, in the embodiment, for example, an arrangement of the nozzles in a case of using three colors of ink is described.

As illustrated in FIG. 2, the line head 20 is provided with a base plate 21 and a plurality of nozzle units 22 which are arranged and fixed on the base plate 21.

Examples of the base plate 21 include a transparent substrate such as glass. A plurality of first nozzle holes 23 for discharging ink are formed on the base plate 21.

In such a configuration, it is preferable that the printer head is an oblique head. If the printer head is the oblique head, apparent resolution of the nozzle is improved while a wiping area becomes wider. In this case, an area having black ink and color ink mixed is wide, and thus the aggregation is likely to occur. Accordingly, the invention is particularly useful. Note that, the term "oblique head" represents a head in which the printer head is obliquely disposed with respect to a sheet feed direction. Specifically, the oblique head represents a head in which a plurality of nozzle rows which are obliquely arranged with respect to the transporting direction which is the first direction, and each of which is formed of the plurality of first nozzle holes 23.

Further, an alignment mark 24 which is used at the time of bonding plurality of nozzle units 22 is formed on the base plate 21.

In addition, the first nozzle hole 23 and the alignment mark 24 are formed on the base plate 21 through a photolithography method and an etching method. It is possible to improve the positional accuracy the first nozzle hole 23 and the alignment mark 24 by using the photolithography method. Specifically, for example, it is possible to suppress the positional accuracy to be equal to or less than 0.5 μm.

The nozzle unit 22 functions of discharging ink, and is disposed for each nozzle row. In addition, the nozzle unit 22 includes a nozzle unit plate 26 (refer to FIG. 3 and FIG. 4) as a second substrate on which a plurality of second nozzle holes 25 which are ink discharging portions are formed. Examples of the nozzle unit plate 26 include a silicon substrate and a glass substrate.

In addition, when the nozzle unit 22 is bonded to the base plate 21, the second nozzle holes 25 and first nozzle hole 23 communicate with each other. Further, an alignment mark 27 which is used at the time of bonding the nozzle unit 22 and the base plate 21 is formed in the nozzle unit 22.

When a plurality of the nozzle units 22 are arranged on the base plate 21, the nozzle holes 23 and 25 are arranged on the entire width of the recording sheet 11. The line head 20 enables the high-quality printing by disposing the alignment mark 27 of the nozzle unit 22 based on the alignment mark 24 of the base plate 21.

Figure 3:
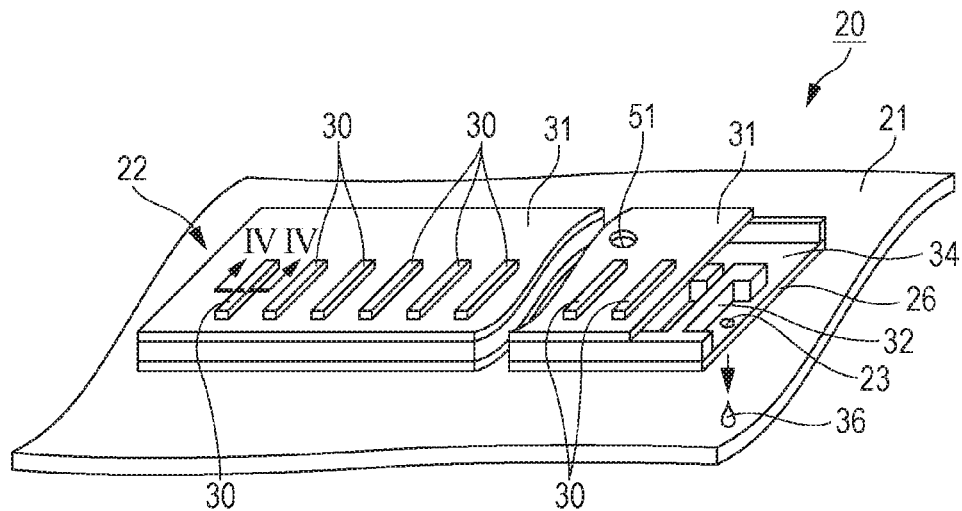
FIG. 3 is an enlarged perspective view schematically illustrating a structure of an A portion of the line head illustrated in FIG. 2A to FIG. 2C.
Figure 4:
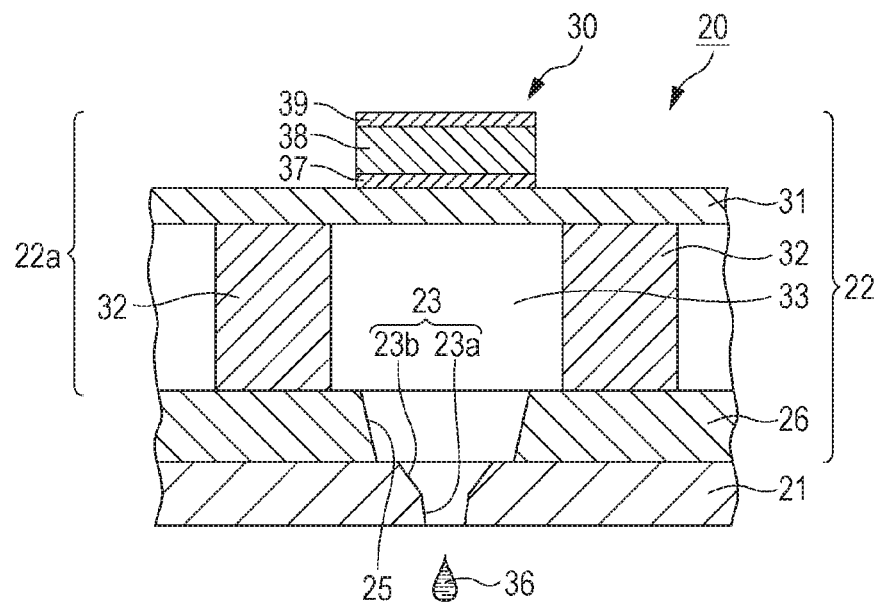
FIG. 4 is a schematic sectional view taken along line IV-IV of the line head illustrated in FIG. 3.

FIG. 3 is an enlarged perspective view schematically illustrating a structure of an A portion of the line head illustrated in FIG. 2A to FIG. 2C. FIG. 4 is a schematic sectional view taken along line IV-IV of the line head illustrated in FIG. 3. Hereinafter, the structure of the line head will be described with reference to FIG. 3 and FIG. 4.

The line head 20 as illustrated in FIG. 3 and FIG. 4 illustrates a structure of the line head 20 corresponding to a single color of the respective colors such as cyan (C), magenta (M), yellow (Y), and black (K). Note that, the same is true for the structure of the line head 20 corresponding to other colors.

The nozzle unit 22 forming the line head 20 includes the nozzle unit plate 26 and an actuator 22a. The actuator 22a includes a vibrating plate 31 and a partition wall 32, and the partition wall 32 is interposed between the nozzle unit plate 26 and the vibrating plate 31. Further, the actuator 22a is has a structure of discharging ink by including an ink pressure chamber 33 which communicates with each of the second nozzle holes 25, and changing the pressure of each ink pressure chamber 33 by using a piezoelectric element (a vibrating element 30). In addition, the ink pressure chambers 33 are connected to each other via a common ink chamber 34 having a large capacity, and the common ink chamber 34 has a structure in which ink is supplied from an ink supply source (not shown).

For example, an ink cartridge 35 (refer to FIG. 1) in which the respective types of color ink such as cyan (C), magenta (M), yellow (Y), and black (K) in which dye or a pigment is contained in a solvent are separately accommodates is disposed on an upper portion of the nozzle unit 22. In addition, ink droplets 36 corresponding to each color ink supplied from the ink cartridge 35 are discharged from the second nozzle holes 25 to the first nozzle hole 23.

Meanwhile, examples of the method of discharging of the ink droplets 36 from the line head 20 include a piezo method of discharging the ink droplets 36 by applying a voltage on a piezoelectric element (piezo element) so as to deform the piezoelectric element, and a thermal ink jet method of discharging the ink droplets 36 by applying a voltage on a heating resistor such as a heater such that the ink is heated so as to generate air bubbles, thereby pressuring the ink with the air bubbles.

The plurality of first nozzle holes 23 of each of the base plates 21 are formed in a straight line at a 0.2 mm of gap (pitch), for example, and the distance between a right end and a left end of the first nozzle holes 23 is slightly larger than the width of the recording sheet 11. In addition, a first electrode 37, a piezo element 38, and a second electrode 39 are respectively stacked on the upper side of the vibrating plate 31 of the ink pressure chamber 33.

As illustrated in FIG. 4, a sectional shape of the first nozzle hole 23 of the base plate 21 has, for example, two-stage of tapered holes 23a and 23b which have different inclination. An aperture of the second nozzle hole 25 which communicates with the first nozzle hole 23 is larger than an aperture of the first nozzle hole 23.

As such, the first nozzle hole 23 is formed of a normal aperture from which ink is discharged, and the second nozzle hole 25 is set to be larger than the first nozzle hole 23. Therefore, the positional deviation (alignment accuracy) can be allowed when the base plate 21 and the nozzle unit 22 are combined with each other, and thereby suppressing the influence of the change of an ejection amount or the like.

A hole 51 which is connected to the ink cartridge is provided in the vicinity of the vibrating plate 31. When the ink is supplied to the common ink chamber 34 from an ink pack (not shown) of each color in the ink cartridge 35 via the hole 51, and then voltages from both electrodes 37 and 39 are applied to the piezo element 38, the pressure in the ink pressure chamber 33 is changed due to the vibration of the vibrating plate 31 which is caused by expansion and contraction of the piezo element 38, and the ink stored in the ink pressure chamber 33 is discharged from the nozzle holes 23 and 25 as the ink droplets 36.

Wiping Mechanism

Next, the wiping mechanism which wipes the ink jet discharging nozzle by using a wiping member. A wiping mechanism which pressures and wipes the nozzles is preferably used. In a case of a pressure wipe, and when there are a number of nozzles, it is preferable to discharge ink from the nozzle and then wipe the ink (pressure-wiping) in order to suppress drawing-in of the ink into the inside of the nozzle. However, when performing the pressure-wiping, an amount of ink to be wiped further increased, and thus there is a tendency that the aggregation is likely to occur. Therefore, the invention is particularly useful.

Hereinafter, the wiping mechanism will be described with reference to a maintenance device 129 which obtainable in the embodiment. First, as illustrated in FIG. 5, the maintenance device 129 is provided with a cap member 141 which has an opened upper side and a bottomed substantially rectangular box-shape. A seal member 142 which is formed of a flexible material and has a rectangular frame is disposed on the entire upper surface of peripheral wall 141a of the cap member 141.

Figure 5A:
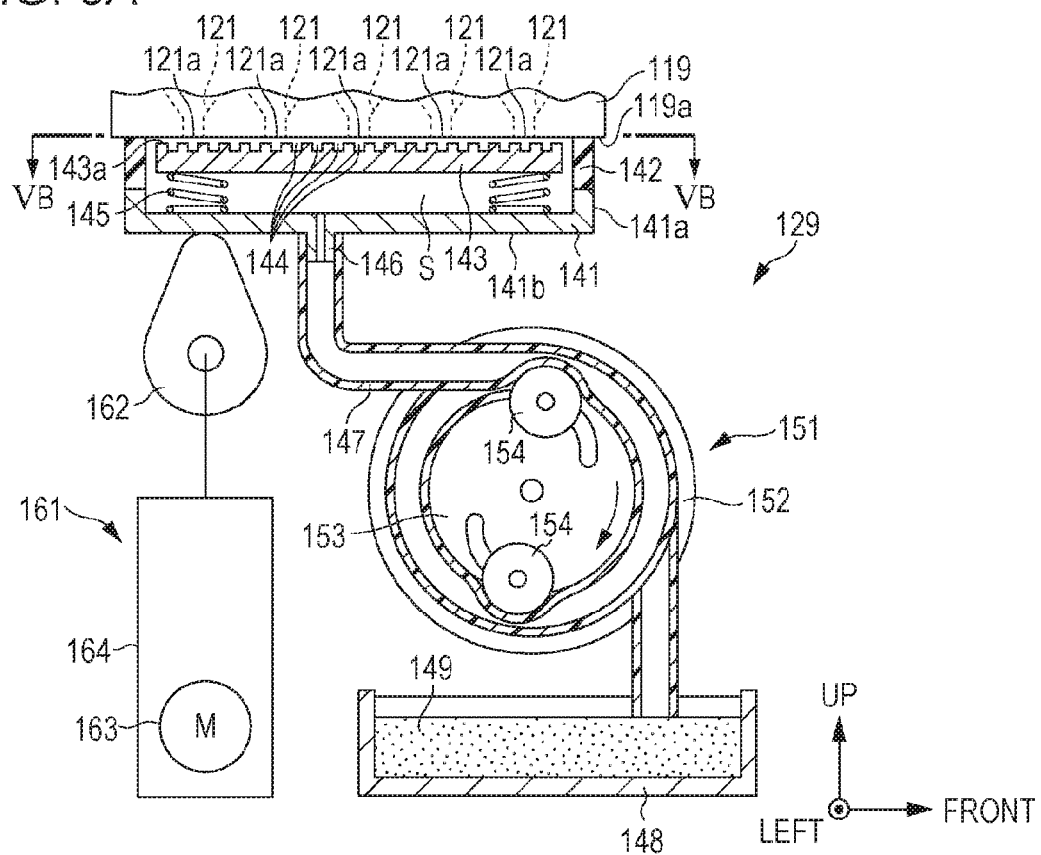
FIG. 5A is a schematic sectional view illustrating a configuration of a maintenance device.
Figure 5B:
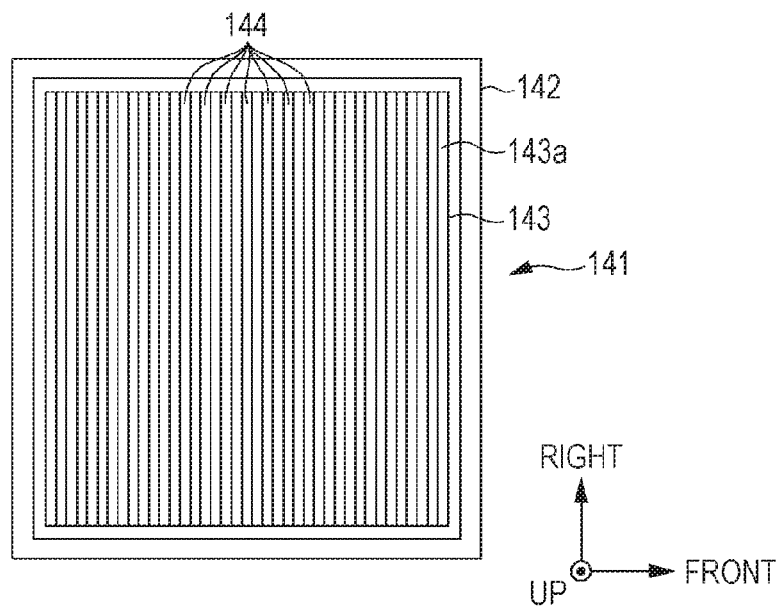
FIG. 5B is a plan view taken along arrow line VB-VB in FIG. 5A.

In addition, as illustrated in FIG. 5A and FIG. 5B, in the cap member 141, a contact member 143 which is formed of an elastic member such as rubber and has a rectangular shape in a planar view is disposed so as to face a nozzle formation surface 119a of a recording head 119 in the vertical direction. A plurality of flow passages 144 which have a rectangular cross-section are linearly formed on an upper surface 143a of the contact member 143 along the direction intersecting with the nozzle row of the recording head 119 (that is, the horizontal direction which is a main scanning direction). That is, the flow passage 144 is formed in a groove shape to which both ends of the contact member 143 are opened in the horizontal direction.

In addition, in the embodiment, the cross-section of each flow passage 144 is lower than an opening area of a nozzle opening 121a of a nozzle 121. That is, when comparing a pressure loss of the flow passage 144 and a pressure loss of the nozzle 121, the pressure loss of the flow passage 144 is greater than the pressure loss of the nozzle 121. Accordingly, the ink which is discharged from the nozzle 121 and then flows into the flow passage 144 receives a large flow resistance compared with a case where the ink flows into the nozzle 121 in the flow passage 144. Note that, even in a case of the flow passage 144 in which such a pressure loss is set to be large, the passage of gases can be allowed. Meanwhile, in the embodiment, the size of the nozzle opening 121a is in a range of 20 μm to 50 μm, and the flow passage 144 is a smaller groove than the nozzle opening 121a, and thus even when the ink flows into in the flow passage 144, the ink is held in a thin groove without expanding along the groove.

In addition, the contact member 143 is supported on a bottom wall 141b of the cap member 141 via a coil spring 145. Further, in the embodiment, the length of the coil spring 145 is set during the non-contracted state (normal state) such that the upper surface 143a of the contact member 143 is disposed at a position which is lower than a tip end portion of the seal member 142 in the cap member 141.

Further, as illustrated in FIG. 5B, the length of the contact member 143 in the longitudinal direction (the horizontal direction) is shorter than the length of the cap member 141 in the longitudinal direction (the horizontal direction). In addition, in a case where the contact member 143 is disposed in the cap member 141, a peripheral wall 141a of the cap member 141 and the left and right sides of the contact member 143 are separated from each other. That is, both ends of the flow passage 144 which are opened to the left and right sides of the contact member 143 are opened.

Further, in a state where the contact member 143 comes in contact with the nozzle formation surface 119a of the recording head 119, the contact member 143 covers each of the openings of all of the nozzles 121 which are formed on the nozzle formation surface 119a of the recording head 119. Here, in a case where the recording head 119 or the contact member 143 is slightly deformed, the nozzle formation surface 119a of the recording head 119 and the upper surface 143a of the contact member 143 does not come in closely contact with each other, but an clearance space area CS (refer to FIG. 6A to FIG. 6C) is formed between the nozzle formation surface 119a and the upper surface 143a. Further, the upper surface 143a of the contact member 143 is formed in the clearance space area CS such that the pressure loss when the ink flows into the clearance space area CS is greater than the pressure loss when the nozzle 121 causes the ink to flow. In this way, the upper surface 143a of the contact member 143 serves as a contact surface which comes in contact with the nozzle formation surface 119a.

In addition, the ink is discharged from the cap member 141, and thus a discharge pipe 146 is provided to protrude downward in a substantially central portion of the bottom wall 141b in the cap member 141. One end side (upstream side) of a discharge tube 147, which is formed of a flexible member and forms a tube pump 151 as an absorbing means, is connected to the discharge pipe 146. On the other hand, the other side (downstream side) of the discharge tube 147 is inserted into a waste ink tank 148. In addition, a waste ink absorber 149 which is formed of a porous material is accommodated in the waste ink tank 148.

A tube pump 151 is disposed between the cap member 141 and the waste ink tank 148. The tube pump 151 accommodates a middle portion of the discharge tube 147, a rotating body 153 which rotates around an axial line of the case 152, and a pair of pressing roller 154 which are capable of compressing the discharge tube 147 while moving along the inner periphery of the case 152 when the rotating body 153 rotates, in a case 152 which is formed into a substantially cylindrical shape. In addition, when the rotating body 153 is rotated in a positive direction (a clockwise direction indicated by a solid line arrow in FIG. 5A), the pressing rollers 154 rotate while sequentially crushing the middle portion of the discharge tube 147 from the cap member 141 side (upstream side) to the waste ink tank 148 side (downstream side). With this rotation, the air in the discharge tube 147 is discharged, and thus the inside of the discharge tube 147 on the upstream side is decompressed by the tube pump 151. Then, the ink in the cap member 141 is absorbed. In addition, when the rotating body 153 is rotated in a reverse direction, the decompression state of the inside of the discharge tube 147 is eliminated.

In addition, the maintenance device 129 is provided with a lifting mechanism 161 that ascends and descends the cap member 141 in the vertical direction. The lifting mechanism 161 is provided with a cam member 162 which comes in contact with the cap member 141 from below, a second motor 163 for rotating the cam member 162, and a power transmission system 164. In addition, when the second motor 163 is driven in the positive direction, the cam member 162 is rotated via the power transmission system 164, the cap member 141 is lifted, and thereby the contact member 143 comes in contact with the nozzle formation surface 119a.

Next, an effect of the recording apparatus with above-described configuration, particularly, an effect when air bubbles are removed from the nozzle 121 of the recording head 119 will be described below. In the recording apparatus, air bubbles are mixed into the ink supply tube, or air bubbles are mixed into the nozzle 121 from the opening of the nozzle 121 at the time of exchanging ink cartridges, thereby resulting in occurrence of dot omission. In order to prevent printing quality from being deteriorated caused by the dot omission, in the recording apparatus, pressure cleaning is performed by using the maintenance device 129.

First, when the pressure cleaning is started, the recording apparatus moves a carriage to a home position in an upper area of the maintenance device 129 and then stops the pressure cleaning. Subsequently, the lifting mechanism 161 lifts up the cap member 141 and causes a tip end of the seal member 142 in the cap member 141 to come in contact with the nozzle formation surface 119a. Then, a closed area S is formed between the nozzle formation surface 119a and the cap member 141. In addition, when the lifting mechanism 161 further lifts up the cap member 141, the tip end of the seal member 142 is strongly brought into pressure contact with the nozzle formation surface 119a.

Then, the seal member 142 in the cap member 141 is compressed by the nozzle formation surface 119a as being crushed in the vertical direction, and thus the bottom wall 141b of the cap member 141 comes near the nozzle formation surface 119a. As a result, as illustrated in FIG. 6A, in a state where the contact member 143 is supported on the bottom wall 141b of the cap member 141 via the coil spring 145, the contact member 143 comes in contact with the nozzle formation surface 119a so as to cover the nozzle openings 121a of the nozzles 121 which are formed on the nozzle formation surface 119a (contact stage). In this regards, in a case where the recording head 119 or the contact member 143 is slightly deformed, the clearance space area CS is formed between the nozzle formation surface 119a of the recording head 119 and upper surface 143a of the contact member 143.

Subsequently, in a state where the contact member 143 comes in contact with the nozzle formation surface 119a of the recording head 119, the recording head 119 is driven. In this case, ink is discharged from the normal nozzles 121 (nozzles at both ends in FIG. 6A to FIG. 6C) into which air bubbles are not mixed to each corresponding flow passage 144 (discharging stage). In this case, the cross-section of the flow passage 144 is smaller than that of the nozzle 121, and thus the ink which is discharged from the normal nozzles 121 remains in the flow passage 144 without being discharged by passing through the flow passage 144 to which the nozzle 121 corresponds. On the other hand, the ink is not discharged from the nozzle into which the air bubbles are mixed even when the recording head 119 is driven, and thus the ink does not flow into the flow passage 144. For this reason, the flow passage resistance in the flow passage 144 which includes the discharged ink becomes greater than the flow passage resistance in the flow passage 144 which does not include the discharged ink.

Next, an on-off valve is turned off, and discharges the ink in the pressure chamber by driving the pressure pump in the discharging direction. The ink discharged from the pressure chamber by the pressure pump is prevented from flowing toward the upstream side and thus flows toward the recording head 119 side which corresponds to the downstream side. In addition, with the ink discharged from the pressure chamber, pressure is applied to the ink in the nozzle 121 via the ink supply tube and ink chamber. Then, as illustrated in FIG. 6B, the ink is discharged toward each corresponding flow passage 144 from the normal nozzles 121 (the nozzles at both ends in FIG. 6A to FIG. 6C) in which the ink is easily discharged among the nozzles 121 which are formed in the recording head 119.

The ink discharged from the normal nozzles 121 flows (passes) toward openings at both ends in each flow passage 144 corresponding to each of the nozzles 121 in the horizontal direction; however, the flowing-in ink from the previous discharging stage remains in the flow passage 144, and thus the pressure loss of the flow passages 144 becomes greater. For this reason, since the ink which flows into the flow passage 144 receives the flow passage resistance of the flow passage 144, the amount of ink flowing into (passing through) the flow passage 144 is regulated. Therefore, the ink is prevented from being discharged from the normal nozzles 121.

In addition, in a case where the clearance space area CS is formed between the nozzle formation surface 119a of the recording head 119 and the upper surface 143a of the contact member 143, the ink discharged from the normal nozzles 121 circularly flows and spreads in the clearance space area CS on each of the nozzles 121. However, similar to the case of the flow passage 144, the aforementioned clearance space area CS is also has a pressure loss greater than that of the nozzle 121, and thus it is possible to prevent the ink from being discharged from the normal nozzles 121 by regulating the amount of ink flowing into the clearance space area CS.

Here, since the inside of the nozzle 121 is pressurized by using a quantification pressurizing method, when the ink is prevented from being discharged from the normal nozzles 121, a pressing force by the pressure pump is synergistically concentrated on the flow passage has less pressure losses, that is, the nozzle 121 (the nozzle in the center in FIG. 6A to FIG. 6C) in which the air bubbles are mixed into the inside where the ink is not discharged yet. As a result, as illustrated in FIG. 6C, high pressure is applied on the nozzle 121 into which the air bubbles are mixed, and thus the air bubbles in the nozzle 121 is discharged together with the ink (liquid discharging stage). In addition, the air bubbles (gas) discharged from the nozzle 121 are discharged to the outside of the contact member 143 through the flow passage 144. From the above aspects, the contact member 143 serves as a flow passage forming member in which the flow passage 144 which includes the upper surface (contact surface) 143a coming in contact with the nozzle formation surface 119a so as to cover the nozzle opening 121a, has the pressure loss which is greater than that of the nozzle 121, and allows the gas to pass therethrough is formed. Since the discharged ink flows into the flow passage 144, the pressure loss becomes greater, thereby suppressing the ink discharge along the nozzle. In addition, the on-off valve is turned on so to complete the pressure cleaning.

As described above, when the pressure cleaning for the nozzle 121 is completed in the recording head 119, the lifting mechanism 161 descends the cap member 141 to the original position. Thereafter, an idle suction is performed on an internal space area of the cap member 141 by driving the tube pump 151. At this time, the ink which flows into and then remains in each flow passage 144 of the contact member 143 is discharged into a waste ink tank 148 by being absorbed from both opened ends of each flow passage 144.

In addition, if there is a vacant time between the starting (restarting) of a recording process and the completing of the pressure cleaning for the nozzle 121 in the recording head 119, in a state where the ink remains in each flow passage 144 of the contact member 143, the cap member 141 is brought into contact with the nozzle formation surface 119a of the recording head 119. When the ink exists in each flow passage 144, it is possible to prevent the ink in the nozzle 121 from being dried with a moisturizing effect of the ink.

EXAMPLE

Hereinafter, the invention will be described more specifically with reference to Examples and Comparative Examples. The invention is not intended to be limited by the following examples.

Materials for Ink Composition

The materials which are mainly used in the following Examples and Comparative Examples are as follows.

Coloring Material
 Carbon black (CAB-O-JET300 (a product name), manufactured by Cabot. Corporation, 15% of solid content, carboxyl group exists on surface)

Resin Particle
 Styrene acrylic resin (KE-1060 (a product name), manufactured by Seiko PMC Co., Ltd., carboxyl group exists on surface)
 Urethane (UPRENE UXA307 (a product name), manufactured by Sanyo Chemical Industries, Ltd., carboxyl group does not exist on surface)
 Polyethylene (Hi-tech E, (a product name), manufactured by Toho Chemical Industry Co., Ltd. carboxyl group does not exist on surface)

Surfactant
 Acetylene glycol-based surfactant (OLFINE E1010 (a product name), manufactured by Nissin Chemical Industry Co., Ltd.

Humectant
 Glycerin

Penetrant
 1.2-hexane diol

Organic Alkali Compound
 TPA (triisopropanolamine)
 TEA (triethanolamine)

Acid
 Oleic acid
 Phosphoric acid
 Boric acid

Betaine
 Trimethyl glycine
 Dimethyl glycine
 Glycine

Preparation of Black Ink Composition

The respective materials are mixed in compositions as shown in Table below, and are sufficiently stirred so as to obtain each ink composition. Specifically, each ink is prepared by uniformly mixing the respective materials and removing insoluble materials by using a filter. Note that, in the following Table, a unit of numerical value is mass %, and a total of the value is 100.0 mass %.

Preparation of Color Ink Composition

The color ink compositions (C color ink, M color ink, and Y color ink) were prepared in the same way as in a case of the black ink composition except that C.I. PIGMENT BLUE 15:4, C.I. PIGMENT RED 122, and C.I. PIGMENT YELLOW 74 are used as a pigment, and a total amount of the metal alkali ions are set as indicated in Table.

TABLE

| | | | | | Examples | | | | | | |
| --- | --- | --- | --- | --- | --- | --- | --- | --- | --- | --- | --- |
| | | | | | 1 | 2 | 3 | 4 | 5 | 6 | 7 |
| Black ink composition | Pigment | Carbon black | carboxyl group exists on surface | [mass] | 7% | 7% | 7% | 7% | 7% | 7% | 7% |
| | Resin | Styrene acrylic resin | carboxyl group exists on surface | [mass] | 3% | 3% | 3% | 3% | 3% | 3% | 3% |
| | | Urethane | carboxyl group does not exist on surface | [mass] | | | | | | | |
| | | Polyethylene | carboxyl group does not exist on surface | [mass] | | | | | | | |
| | Alkali | Potassium ion | | [mol/L] | 0.07 | 0.05 | 0.05 | 0.2 | 0.05 | 0.05 | 0.05 |
| | | Sodium ion | | [mol/L] | 0.005 | 0.005 | 0.005 | 0.1 | 0.0001 | 0.005 | 0.005 |
| | | TPA | | [mol/L] | 0.05 | 0.05 | 0.05 | 0.05 | 0.05 | 0.05 | |
| | | TEA | | [mol/L] | | | | | | | 0.05 |
| | Acid | Oleic acid | | [mass] | | 0.2% | 0.2% | 0.4% | | | 0.2% |
| | | Phosphoric acid | | [mass] | | | | | 0.2% | | |
| | | Boric acid | | [mass] | | | | | | 0.2% | |
| | Betaine | Trimethyl glycine | | [mass] | 5% | 5% | 5% | 5% | 5% | 5% | 5% |

TABLE-continued

|  |  |  |  | | | | | | | |
|---|---|---|---|---|---|---|---|---|---|---|
| | | Dimethyl glycine | [mass] | | | | | | | |
| | | Glycine | [mass] | | | | | | | |
| | Surfactant | Acetylene glycol-based surfactant | [mass] | 1% | 1% | 1% | 1% | 1% | 1% | 1% |
| | Humectant | Glycerin | [mass] | 10% | 10% | 10% | 10% | 10% | 10% | 10% |
| | Penetrant | 1.2-hexane diol | [mass] | 2% | 2% | 2% | 2% | 2% | 2% | 2% |
| | Water | | | Remain | Remain | Remain | Remain | Remain | Remain | Remain |
| | pH | | | 10 | 9 | 9 | 9 | 9 | 9 | 9 |
| C color ink | A total content of the metal alkali ion | | [mol/L] | 0.03 | 0 | 0.1 | 0.03 | 0.03 | 0.02 | 0.02 |
| M color ink | A total content of the metal alkali ion | | [mol/L] | 0.03 | 0 | 0.1 | 0.03 | 0.03 | 0.02 | 0.02 |
| Y color ink | A total content of the metal alkali ion | | [mol/L] | 0.03 | 0 | 0.1 | 0.03 | 0.03 | 0.02 | 0.02 |
| Evaluation of aggregation at the time of wiping | Number of nozzles | Number of times of wiping | Pressurizing | | | | | | | |
| | 360 | 10 times | NONE | A | A | A | A | A | A | A |
| | 600 | 10 times | NONE | A | A | A | A | A | A | A |
| | 2000 | 10 times | NONE | A | A | A | A | A | A | A |
| | 4000 | 10 times | NONE | B | A | A | A | A | A | A |
| | 4000 | 10 times | Pressurized | B | A | A | A | B | B | B |
| | 600 | 10 times for 100 days | NONE | B | A | A | A | B | B | B |
| | 4000 | 10 times for 100 days | NONE | B | A | C | B | C | C | B |

| | | | | Examples | | Comparative Examples | | | | |
|---|---|---|---|---|---|---|---|---|---|---|
| | | | | 8 | 9 | 1 | 2 | 3 | 4 | 5 |
| Black ink composition | Pigment | Carbon black | carboxyl group exists on surface | [mass] | 7% | 7% | 7% | 7% | 7% | 7% | 7% |
| | Resin | Styrene acrylic resin | carboxyl group exists on surface | [mass] | 3% | 3% | 3% | 3% | 3% | 3% | |
| | | Urethane | carboxyl group does not exist on surface | [mass] | | | | | | | 3% |
| | | Polyethylene | carboxyl group does not exist on surface | [mass] | | | | | | | |
| | Alkali | Potassium ion | | [mol/L] | 0.05 | 0.05 | 0.005 | 0.25 | | | 0.05 |
| | | Sodium ion | | [mol/L] | 0.005 | 0.005 | 0.15 | | | | 0.005 |
| | | TPA | | [mol/L] | 0.05 | 0.05 | 0.05 | 0.05 | 0.10 | 0.01 | 0.05 |
| | | TEA | | [mol/L] | | | | | | | |
| | Acid | Oleic acid | | [mass] | 0.2% | 0.2% | 0.2% | 0.5% | 0.1% | | 0.2% |
| | | Phosphoric acid | | [mass] | | | | | | | |
| | | Boric acid | | [mass] | | | | | | | |
| | Betaine | Trimethyl glycine | | [mass] | 5% | | 5% | 5% | 5% | 5% | 5% |
| | | Dimethyl glycine | | [mass] | | 5% | | | | | |
| | | Glycine | | [mass] | | | | | | | |
| | Surfactant | Acetylene glycol-based surfactant | | [mass] | 1% | 1% | 1% | 1% | 1% | 1% | 1% |
| | Humectant | Glycerin | | [mass] | 10% | 10% | 10% | 10% | 10% | 10% | 10% |
| | Penetrant | 1.2-hexane diol | | [mass] | 2% | 2% | 2% | 2% | 2% | 2% | 2% |
| | Water | | | | Remain | Remain | Remain | Remain | Remain | Remain | Remain |
| | pH | | | | 9 | 9 | 9 | 9 | 7 | 9 | 9 |
| C color ink | A total content of the metal alkali ion | | | [mol/L] | 0 | 0.02 | 0.02 | 0.02 | 0 | 0.02 | 0.02 |

TABLE-continued

| | | | | | | | | | | |
|---|---|---|---|---|---|---|---|---|---|---|
| M color ink | A total content of the metal alkali ion | | [mol/L] | 0 | 0.02 | 0.02 | 0.02 | 0 | 0.02 | 0.02 |
| Y color ink | A total content of the metal alkali ion | | [mol/L] | 0 | 0.02 | 0 | 0 | 0 | 0.02 | 0.02 |
| Evaluation of aggregation at the time of wiping | Number of nozzles | Number of times of wiping | Pressurizing | | | | | | | |
| | 360 | 10 times | NONE | A | A | B | A | B | B | B |
| | 600 | 10 times | NONE | A | A | D | B | B | C | D |
| | 2000 | 10 times | NONE | A | A | D | B | B | D | D |
| | 4000 | 10 times | NONE | A | A | D | C | D | D | D |
| | 4000 | 10 times | Pressurized | B | B | D | C | D | D | D |
| | 600 | 10 times for 100 days | NONE | B | B | D | C | D | D | D |
| | 4000 | 10 times for 100 days | NONE | C | C | D | D | D | D | D |

| | | | | | Comparative Examples | | | |
|---|---|---|---|---|---|---|---|---|
| | | | | | 6 | 7 | 8 | 9 |
| Black ink composition | Pigment | Carbon black | carboxyl group exists on surface | [mass] | 7% | 7% | 7% | 7% |
| | Resin | Styrene acrylic resin | carboxyl group exists on surface | [mass] | | 3% | 3% | 3% |
| | | Urethane | carboxyl group does not exist on surface | [mass] | | | | |
| | | Polyethylene | carboxyl group does not exist on surface | [mass] | 3% | | | |
| | Alkali | Potassium ion | | [mol/L] | | 0.10 | 0.005 | 0.05 |
| | | Sodium ion | | [mol/L] | | 0.005 | 0.005 | 0.005 |
| | | TPA | | [mol/L] | | | 0.05 | 0.05 |
| | | TEA | | [mol/L] | 0.100 | | | |
| | Acid | Oleic acid | | [mass] | | | | 0.2% |
| | | Phosphoric acid | | [mass] | | | | |
| | | Boric acid | | [mass] | | | | |
| | Betaine | Trimethyl glycine | | [mass] | | 5% | 5% | |
| | | Dimethyl glycine | | [mass] | | | | |
| | | Glycine | | [mass] | | | | |
| | Surfactant | Acetylene glycol-based surfactant | | [mass] | 1% | 1% | 1% | 1% |
| | Humectant | Glycerin | | [mass] | 10% | 10% | 10% | 10% |
| | Penetrant | 1.2-hexane diol | | [mass] | 2% | 2% | 2% | 2% |
| | | Water | | | Remain | Remain | Remain | Remain |
| | | pH | | | 9 | 11 | 9 | 9 |
| C color ink | A total content of the metal alkali ion | | | [mol/L] | 0.02 | 0 | 0.02 | 0.02 |
| M color ink | A total content of the metal alkali ion | | | [mol/L] | 0.02 | 0 | 0.02 | 0.02 |
| Y color ink | A total content of the metal alkali ion | | | [mol/L] | 0.02 | 0 | 0.02 | 0.02 |

TABLE-continued

| Evaluation of aggregation at the time of wiping | Number of nozzles | Number of times of wiping | Pressurizing | | | | |
|---|---|---|---|---|---|---|---|
| | 360 | 10 times | NONE | C | B | B | B |
| | 600 | 10 times | NONE | D | C | D | C |
| | 2000 | 10 times | NONE | D | C | D | C |
| | 4000 | 10 times | NONE | D | D | D | C |
| | 4000 | 10 times | Pressurized | D | D | D | C |
| | 600 | 10 times for 100 days | NONE | D | D | D | C |
| | 4000 | 10 times for 100 days | NONE | D | D | D | D |

Evaluation of Aggregation at the Time of Wiping

The ink tank of the recording apparatus was filled with the respective ink compositions obtained as described above, and an initial filling operation was performed on the head in accordance with the initial filling sequence. Thereafter, it was confirmed whether or not ink can be discharged from all of the nozzles in the head. Then, an operation in which the printer was put into a 40° C. of thermostatic bath, and a JEITA standard pattern J12 is continuously printed for 1 minute and wiped one at 40° C. is repeated 10 times, and then the number of nozzle omissions was confirmed. Note that, as the recording apparatus in the examples, a recording apparatus which has 360, 600, 2000, or 4000 nozzles for discharging the black ink in each head was used.

In addition, the above repeated 10 times operation in which the printer was put into a 40° C. of thermostatic bath, and a JEITA standard pattern J12 is continuously printed for 1 minute and wiped one at 40° C. was continuously 100 days, and then the number of nozzle omissions was confirmed. This was set to be room temperature accelerated conditions for 100 days printing. Note that, as the recording apparatus in the examples, a recording apparatus which has 600 or 4000 nozzles for discharging the black ink in each head was used. On the basis of the number of the nozzle omissions, the aggregation properties at the time of wiping were evaluated by the evaluation criteria.

Evaluation Criteria
A: 0 nozzle omission
B: 1 to 10 nozzle omissions
C: 11 to 29 nozzle omission
D: 30 or more nozzle omissions The entire disclosure of Japanese Patent Application No. 2015-009816, filed Jan. 21, 2015 is expressly incorporated by reference herein.

What is claimed is:

1. An ink set comprising:
   black ink; and
   color ink,
   wherein the black ink contains carbon black having a carboxyl group on a surface thereof, a resin particle having a carboxyl group on a surface thereof, betaine, an alkali ion, and water,
   wherein the alkali ion contains a potassium ion, a sodium ion, and an organic alkali compound,
   wherein a content of the potassium ion is the largest among the alkali ions, and
   wherein in the black ink, the content of the potassium ion is in a range of 0.0010 mol/L to 0.20 mol/L, and a content of the sodium ion is in a range of 0.00010 mol/L to 0.10 mol/L.

2. The ink set according to claim 1,
   wherein the color ink contains a metal alkali ion, and
   wherein a content of the metal alkali ion is in a range of 0 mol/L to 0.10 mol/L.

3. The ink set according to claim 1,
   wherein the black ink contains at least one acid selected from the group consisting of an organic acid, a phosphoric acid compound, and a boric acid compound.

4. The ink set according to claim 1, which is used for a recording apparatus including a printer head which is provided with 4000 or more ink jet discharging nozzles for each color, and a wiping mechanism which wipes the ink jet discharging nozzles by using a wiping member.

5. The ink set according to claim 4,
   wherein the wiping mechanism is a mechanism for pressurizing and wiping the ink jet discharging nozzle by using the wiping member.

6. The ink set according to claim 1,
   wherein the organic alkali compound contains at least one selected from the group consisting of triisopropanolamine and triethanolamine.

7. The ink set according to claim 1,
   wherein the betaine contains at least one selected from the group consisting of trimethyl glycine, dimethyl glycine, and glycine.

8. A recording apparatus comprising:
   a printer head which is provided with ink jet discharging nozzles; and
   a wiping mechanism which wipes the ink jet discharging nozzle by using a wiping member,
   wherein the ink set according to claim 1 is installed therein.

9. A recording apparatus comprising:
   a printer head which is provided with ink jet discharging nozzles; and
   a wiping mechanism which wipes the ink jet discharging nozzle by using a wiping member,
   wherein the ink set according to claim 2 is installed therein.

10. A recording apparatus comprising:
    a printer head which is provided with ink jet discharging nozzles; and
    a wiping mechanism which wipes the ink jet discharging nozzle by using a wiping member, wherein the ink set according to claim 3 is installed therein.

11. A recording apparatus comprising:
a printer head which is provided with ink jet discharging nozzles; and
a wiping mechanism which wipes the ink jet discharging nozzle by using a wiping member,
wherein the ink set according to claim 4 is installed therein.

12. A recording apparatus comprising:
a printer head which is provided with ink jet discharging nozzles; and
a wiping mechanism which wipes the ink jet discharging nozzle by using a wiping member,
wherein the ink set according to claim 5 is installed therein.

13. A recording apparatus comprising:
a printer head which is provided with ink jet discharging nozzles; and
a wiping mechanism which wipes the ink jet discharging nozzle by using a wiping member,
wherein the ink set according to claim 6 is installed therein.

14. A recording apparatus comprising:
a printer head which is provided with ink jet discharging nozzles; and
a wiping mechanism which wipes the ink jet discharging nozzle by using a wiping member,
wherein the ink set according to claim 7 is installed therein.

15. The recording apparatus according to claim 8, wherein the printer head is an oblique head.

16. An ink set comprising:
black ink; and
color ink,
wherein the black ink contains carbon black having a carboxyl group on a surface thereof, a resin particle having a carboxyl group on a surface thereof, betaine, an alkali ion, and water,
wherein the alkali on contains a potassium ion, a sodium ion, and an organic alkali compound,
wherein a content of the potassium ion is the largest among the alkali ions,
wherein in the black ink, the content of the potassium ion is in a range of 0.0010 mol/L to 0.20 mol/L, and a content of the sodium ion is in a range of 0.00010 mol/L to 0.10 mol/L,
wherein the color ink contains a metal alkali on, and
wherein a content of the metal alkali ion is in a range of 0 mol/L to 0.10mol/L.

17. The ink set according to claim 16,
wherein the black ink contains at least one acid selected from the group consisting of an organic acid, a phosphoric acid compound, and a boric acid compound.

18. The ink set according to claim 16, which is used for a recording apparatus including a printer head which is provided with 4000 or more ink jet discharging nozzles for each color, and a wiping mechanism which wipes the ink jet discharging nozzles by using a wiping member.

19. The ink set according to claim 18,
wherein the wiping mechanism is a mechanism for pressurizing and wiping the ink jet discharging nozzle by using the wiping member.

20. The ink set according to claim 16,
wherein the organic alkali compound contains at least one selected from the group consisting of triisopropanolamine and triethanolamine.

21. The ink set according to claim 16,
wherein the betaine contains at least one selected from the group consisting of trimethyl glycine, dimethyl glycine, and glycine.

22. A recording apparatus comprising:
a printer head which is provided with ink jet discharging nozzles; and
a wiping mechanism which wipes the ink jet discharging nozzle by using a wiping member,
wherein the ink set according to claim 16 is installed therein.

* * * * *